United States Patent
Niikura

(10) Patent No.: US 8,682,068 B2
(45) Date of Patent: Mar. 25, 2014

(54) IMAGE PROCESSING APPARATUS, IMAGE PROCESSING METHOD, AND PROGRAM

(75) Inventor: Kentarou Niikura, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 1039 days.

(21) Appl. No.: 12/656,012

(22) Filed: Jan. 13, 2010

(65) Prior Publication Data

US 2010/0215260 A1    Aug. 26, 2010

(30) Foreign Application Priority Data

Feb. 25, 2009  (JP) .................................. 2009-042536

(51) Int. Cl.
*G06K 9/00* (2006.01)

(52) U.S. Cl.
USPC ............ 382/167; 382/163; 382/164; 382/165

(58) Field of Classification Search
USPC ................................................ 382/162–167
See application file for complete search history.

(56) References Cited

U.S. PATENT DOCUMENTS

| | | | | |
|---|---|---|---|---|
| 5,926,562 | A * | 7/1999 | Hyodo et al. ................. | 382/167 |
| 5,982,926 | A * | 11/1999 | Kuo et al. ...................... | 382/167 |
| 6,898,329 | B1 | 5/2005 | Takahashi | |
| 2003/0174216 | A1 * | 9/2003 | Iguchi et al. ............... | 348/223.1 |
| 2008/0266417 | A1 | 10/2008 | Abe | |
| 2008/0285884 | A1 | 11/2008 | Nishijima | |
| 2009/0167891 | A1 * | 7/2009 | Uezono ...................... | 348/223.1 |

FOREIGN PATENT DOCUMENTS

| | | |
|---|---|---|
| CN | 101296384 A | 10/2008 |
| JP | 6-133303 A | 5/1994 |
| JP | 11-275454 A | 10/1999 |
| JP | 11-317873 A | 11/1999 |
| JP | 2003-85556 A | 3/2003 |
| JP | 2005-109705 | 4/2005 |
| JP | 2005-109705 A | 4/2005 |

OTHER PUBLICATIONS

European Search Report dated Mar. 8, 2012.
Chinese Office Action dated Apr. 11, 2013, with English-language translation.
Chinese Office Action dated Dec. 18, 2013 with English translation thereof.

* cited by examiner

*Primary Examiner* — Amir Alavi
*Assistant Examiner* — Kenny Cese
(74) *Attorney, Agent, or Firm* — McGinn Intellectual Property Law Group, PLLC

(57) ABSTRACT

A representative pixel value calculation unit (120) divides an image represented by raw data (D0) into a plurality of blocks and calculates representative pixel values (S) for each block. A detection unit (130) detects an object block which is a block including a blown-out highlight or a blocked-up shadow, from among the plurality of blocks. A B-detection unit (134) of the detection unit (130) performs a first detection processing for obtaining one of a difference between a color represented by the representative pixel values and gray, and a value that can approximately represent the difference, as a characteristic value, and for detecting, as the object block, a block in which the characteristic value is equal to or smaller than a first threshold. Consequently, blown-out highlights or blocked-up shadows included in an image can be detected at higher speed, and the omission of detection can be prevented.

15 Claims, 2 Drawing Sheets

IMAGE PROCESSING APPARATUS, IMAGE PROCESSING METHOD, AND PROGRAM

INCORPORATION BY REFERENCE

This application is based upon and claims the benefit of priority from Japanese patent application No. 2009-042536, filed on Feb. 25, 2009, the disclosure of which is incorporated herein in its entirety by reference.

BACKGROUND

1. Field of the Invention

The present invention relates to a technique for detecting blown-out highlights or blocked-up shadows in an image.

2. Description of Related Art

In image pickup apparatuses such as digital cameras, white balance control and exposure control are carried out. In order to perform such controls accurately, it is necessary to remove a blown-out highlight portion and a blocked-up shadow portion. For this reason, the blown-out highlight portion and the blocked-up shadow portion are detected.

In recent years, an increasing number of high performance cameras, such as a digital single-lens reflex camera, have a function of storing raw images as they are. In image processing apparatuses for processing raw images, white balance correction and exposure correction are carried out. To perform such corrections with high accuracy, it is necessary to remove a blown-out highlight portion and a blocked-up shadow portion. For this reason, the blown-out highlight portion and the blocked-up shadow portion are detected also in the image processing apparatuses.

The detection of blown-out highlights and blocked-up shadows is usually performed based on the brightness of pixels. However, the detection of blown-out highlights and blocked-up shadows in each pixel is undesirably time consuming. When blown-out highlights and blocked-up shadows are detected using hardware, there arises a problem of an increase in circuit size. Especially in the field of image pickup apparatuses, it is difficult to meet market needs for downsizing.

Japanese Unexamined Patent Application Publication No. 2005-109705 discloses a technique for solving the above-mentioned problems. According to the technique, an image is divided into a plurality of blocks, and blocks which include blown-out highlights or blocked-up shadows are detected based on average pixel values obtained for each block. In the case of obtaining correction values for the white balance correction, operation is performed on blocks other than the detected blocks including blown-out highlights or blocked-up shadows.

Specifically, according to the technique, the detection is carried out such that a block in which all the average pixel values of R value, G value, and B value are equal to or greater than a predetermined threshold (hereinafter referred to as "blown-out highlight threshold") is detected as a blown-out highlight area, and a block in which all the average pixel values of R value, G value, and B value are equal to or smaller than a predetermined threshold (hereinafter referred to as "blocked-up shadow threshold") is detected as a blocked-up shadow area.

SUMMARY

The present inventor has found a problem as described below. Even when a part of pixels included in a block are blown-out highlight pixels, the average pixel values of the block are not always equal to or greater than the blown-out highlight threshold. Likewise, even when a part of pixels included in a block are blocked-up shadow pixels, the average pixel values of the block are not always equal to or smaller than the blocked-up shadow threshold. For this reason, the technique disclosed in Japanese Unexamined Patent Application Publication No. 2005-109705 has a problem in that omission of detection of blocks including blown-out highlights or blocked-up shadows may occur. Such detection omission has an adverse effect on the white balance/exposure control and correction. Therefore, there is a demand for preventing the detection omission.

A first exemplary aspect of the present invention is an image processing apparatus. The image processing apparatus includes a representative pixel value calculation unit that divides an image into a plurality of blocks and calculates representative pixel values for each of the plurality of blocks, and a detection unit that detects an object block from among the plurality of blocks, the object block being a block including one of a blown-out highlight and a blocked-up shadow.

The detection unit performs a first detection processing for obtaining one of a difference between a color represented by the representative pixel values and gray, and a value that can approximately represent the difference, as a characteristic value, and for detecting a block having the characteristic value equal to or smaller than a first threshold, as the object block.

Substitution of the apparatus according to the first exemplary aspect of the invention by a method and a system, and a program for causing a computer to execute the functions of the apparatus or part of the functions of the apparatus are also effective as embodiments of the present invention.

According to the technique of the present invention, blown-out highlights or blocked-up shadows included in an image can be detected at higher speed, and the omission of detection can be prevented.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
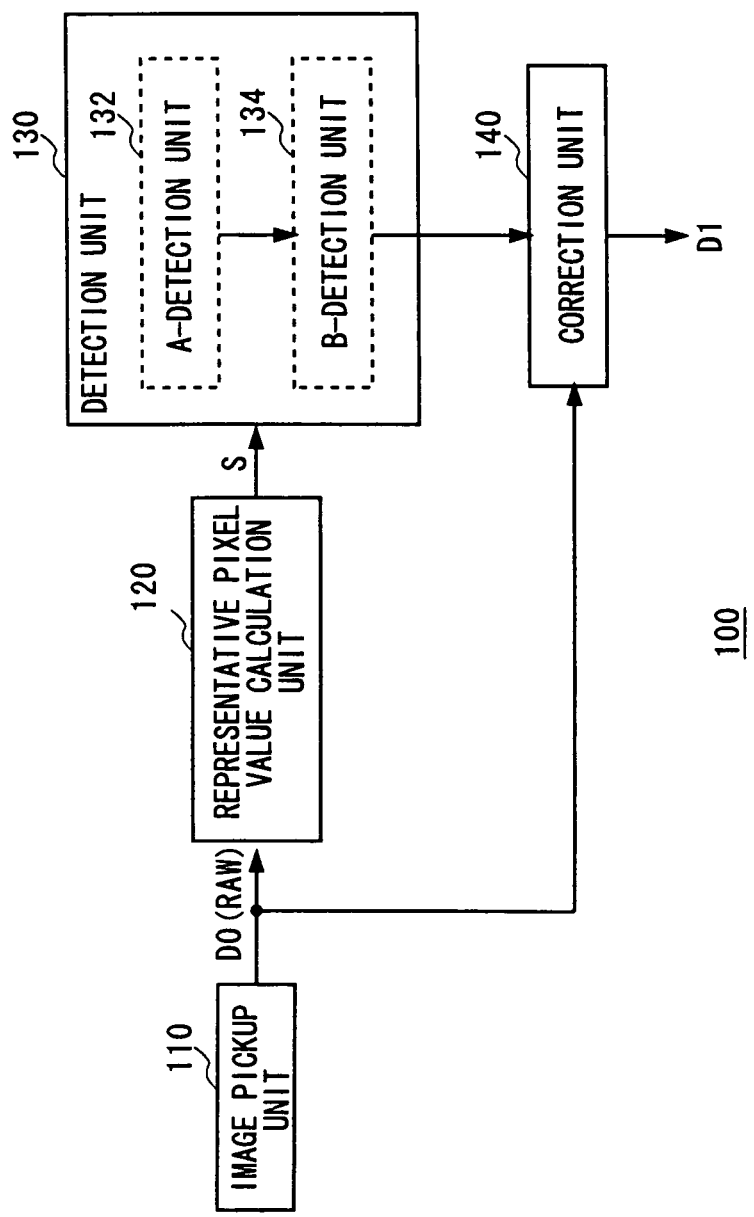
FIG. 1 is a diagram showing a digital camera according to an exemplary embodiment of the present invention.

An exemplary embodiment of the present invention will be described below with reference to the accompanying drawings. To clarify the explanation, the following description and drawings are abridged and simplified as needed. The elements illustrated in the drawings as functional blocks for performing various processings may be implemented hardwarewise by a CPU, a memory, and other circuits, and may be implemented softwarewise by memory-loaded programs or the like. It is thus obvious to those skilled in the art that such functional blocks may be implemented in various forms by hardware only, software only, or a combination of both, and are not limited to one.

Reference is now made to FIG. 1 which shows a digital camera 100 according to an exemplary embodiment of the present invention. The digital camera 100 includes an image pickup unit 110, a representative pixel value calculation unit 120, a detection unit 130, and a correction unit 140. The detection unit 130 includes an A-detection unit 132 and a B-detection unit 134.

The image pickup unit 110 includes an image sensor, for example. The image pickup unit 110 picks up an image of an object to obtain raw data D0, and then outputs the obtained data to each of the representative pixel value calculation unit 120 and the correction unit 140. In this exemplary embodiment, pixel values of the raw data D0 are RGB values.

The representative pixel value calculation unit 120 divides an image represented by the raw data D0 into a plurality of blocks, and calculates representative pixel values S for each block. In this exemplary embodiment, the representative pixel value calculation unit 120 calculates average RGB values (R0, G0, and B0) as the representative pixel values S for each block.

The detection unit 130 detects a block including a blown-out highlight pixel and a block including a blocked-up shadow pixel, based on the average RGB values calculated by the representative pixel value calculation unit 120. A block including a blown-out highlight pixel or a blocked-up shadow pixel are hereinafter referred to as "object block".

In the detection unit 130, the A-detection unit 132 performs a second detection processing, and the B-detection unit 134 performs a first detection processing. The second detection processing and the first detection processing will be described in detail later.

The A-detection unit 132 performs the second detection processing for detecting the object block based on the brightness represented by the representative pixel values S of each block. Specifically, the A-detection unit 132 detects, as the object blocks, a block in which all the average RGB values R0, G0, and B0 are equal to or greater than a predetermined threshold T2 (e.g., 250 in the case of 8-bit data) and a block in which all the average RGB values R0, G0, and B0 are equal to or smaller than a predetermined threshold T3 (e.g., 10 in the case of 8-bit data).

Herein, the block in which all the average RGB values R0, G0, and B0 are equal to or greater than the threshold T2 is a block including a blown-out highlight pixel. The block in which all the average RGB values R0, G0, and B0 are equal to or smaller than the threshold T3 is a block including a blocked-up shadow pixel.

The B-detection unit 134 performs the first detection processing for obtaining a characteristic value that can represent a difference between a color represented by the representative pixel values S and gray, and for detecting the object block based on the characteristic value. The principle of the first detection processing is herein described.

As a result of intense studies and investigations on the characteristics of images captured by a digital image pickup apparatus, the present inventor has found the following facts.

Raw data obtained by picking up an object by the digital image pickup apparatus is data obtained by digitizing a signal received from a photoelectric conversion sensor such as a CCD. In general, due to sensor sensitivity characteristics and lens characteristics (effects of an optical filter or the like), the pixel values (R, G, B) of the raw data corresponding to gray portions of an object are not equal to the values (R=G=B) which indicate gray color that is finally displayed on an output device such as a display. Meanwhile, in the blown-out highlight pixel or the blocked-up shadow pixel, the pixel values (all the R, G, and B values) converge to the upper limit or the lower limit (zero) of a dynamic range that can be expressed in digital form, regardless of the physical characteristics described above. Accordingly, the R, G, and B values become close to each other. For this reason, a color represented by the pixel values of the pixels is close to gray.

The first detection processing is based on these findings. Specifically, a characteristic value that can represent a difference between a color represented by representative pixel values of a block and gray is obtained, and when the characteristic value is equal to or smaller than the predetermined threshold, the block is detected as the object block.

In this exemplary embodiment, the B-detection unit 134 calculates |R0/G0-1| and |B0/G0-1| as the characteristic value that can represent a difference between a color represented by representative pixel values (in this case, average RGB values R0, G0, and B0) and gray. The B-detection unit 134 then detects, as the object blocks, a block in which |R0/G0-1| is equal to or smaller than a threshold (threshold A) corresponding to the predetermined threshold and a block in which |B0/G0-1| is equal to or smaller than a threshold (threshold B) corresponding to the predetermined threshold. In this case, a set of |R0/G0-1| and |B0/G0-1| serves as the "characteristic value". The threshold A and the threshold B are determined so that the difference between the color represented by "R0, G0, B0" and gray is equal to or smaller than the predetermined threshold when |R0/G0-1| is equal to or smaller than the threshold A and when |B0/G0-1| is equal to or smaller than the threshold B. Accordingly, the thresholds A and B are preferably the same for the convenience of calculation, but the thresholds are not necessarily the same. In this exemplary embodiment, a threshold T1 (e.g., 0.2) is applied to both the threshold A and the threshold B.

The detection unit 130 outputs information indicative of the object blocks, which are detected by the A-detection unit 132 and the B-detection unit 134, to the correction unit 140. The correction unit 140 performs correction processing based on the information from the detection unit 130. In this exemplary embodiment, the correction unit 140 performs white balance correction and exposure correction.

Specifically, the correction unit 140 calculates correction values by using data of the raw data D0 other than the data of the object blocks detected by the detection unit 130. Then, the correction processing is performed on the raw data D0 using the calculated correction values, thereby obtaining corrected data D1.

Figure 2:
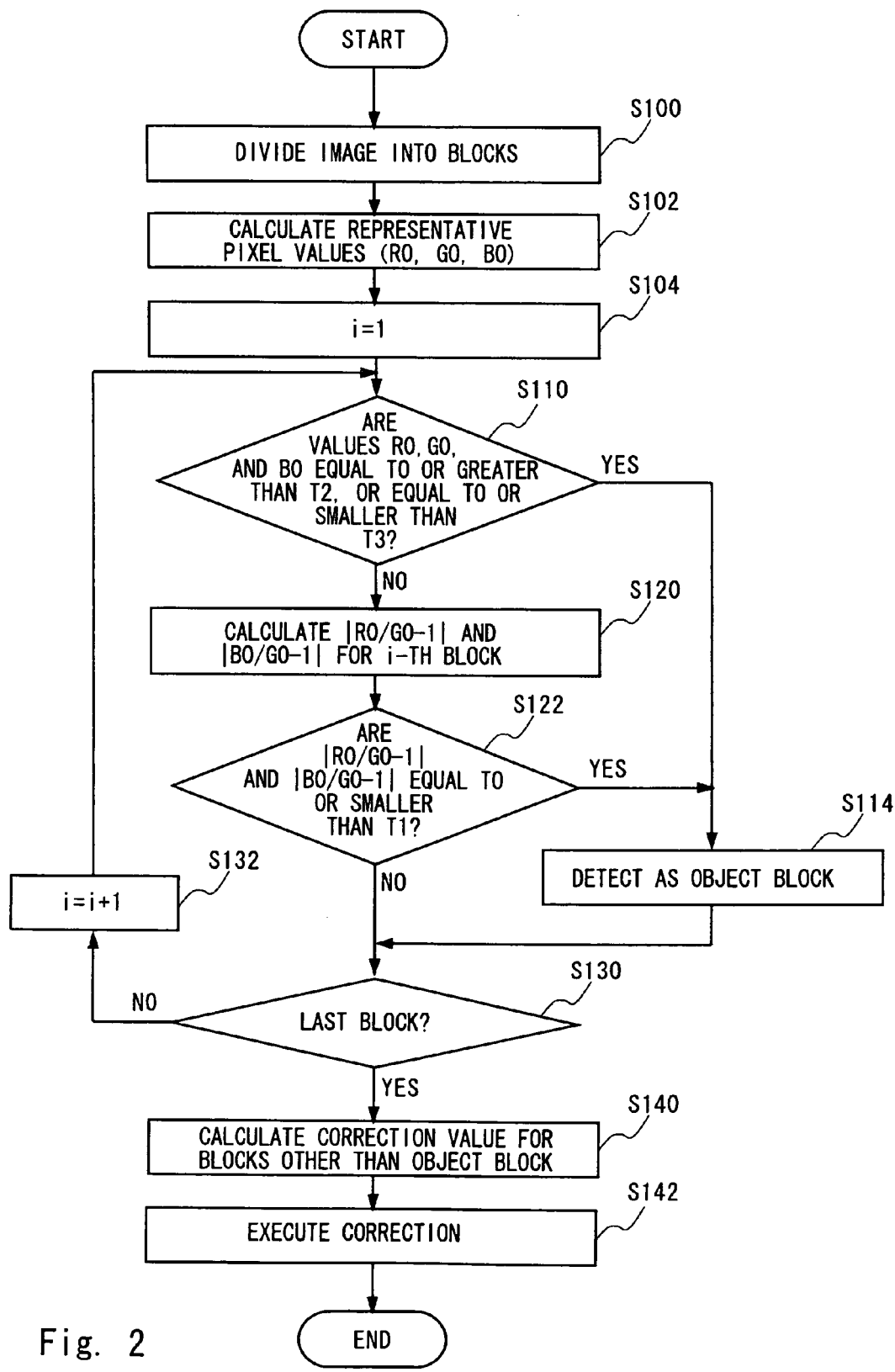
FIG. 2 is a flowchart showing a flow of processing performed by the digital camera shown in FIG. 1.

FIG. 2 is a flowchart showing a flow of processing performed on the raw data D0 obtained by the image pickup unit 110 in the digital camera 100.

First, the representative pixel value calculation unit 120 divides an image represented by the raw data D0 into a plurality of blocks, and calculates the representative pixel values S (in this case, average RGB values R0, G0, and B0) for each block (S102).

Then, the A-detection unit 132 performs the second detection processing on each block. Specifically, when all the average RGB values R0, G0, and B0 are equal to or greater than the threshold T2, or are equal to or smaller than the threshold T3, the A-detection unit 132 detects blocks that satisfy the conditions, as the object blocks (S110: Yes, S114).

The B-detection unit 134 performs the first detection processing on blocks other than the blocks detected by the A-detection unit 132 as the object blocks. Specifically, the B-detection unit 134 calculates |R0/G0-1| and |B0/G0-1| for these blocks, and detects blocks in which both |R0/G0-1| and |B0/G0-1| are equal to or smaller than the threshold T1, as the object blocks (S110: No, S120, S122: Yes, S114).

The correction unit 140 calculates correction values for the white balance correction and exposure correction by using data of the raw data D0 other than the data of the object blocks detected by the A-detection unit 132 and the B-detection unit 134 of the detection unit 130, and corrects the raw data D0 by using the calculated correction values (S140, S142).

In the case of dividing an image into a plurality of blocks to detect the object blocks by using the representative pixel values S of each block, the digital camera 100 of this exemplary embodiment carries out the first detection processing based on the characteristic value that can represent the difference between the color represented by the representative pixel values S and gray, in addition to the second detection processing based on the brightness represented by the representative pixel values S. The detection for each block makes it possible to improve the processing speed and reduce the circuit size, and prevent the omission of detection.

In this exemplary embodiment, |R0/G0-1| and |B0/G0-1| are used as the characteristic value that can approximately represent the difference between the color represented by the representative pixel values S and gray. When the color represented by the representative pixel values S is black or magenta, for example, G0 is "0". In this case, if the B-detection unit 134 performs processing also on such blocks, the operation of |R0/G0-1| and |B0/G0-1| is collapsed. Meanwhile, in this exemplary embodiment, the B-detection unit 134 performs the second detection processing on blocks other than the blocks detected as the object blocks by the A-detection unit 132, and thus blocks in which G0 is "0" are excluded from these blocks. This makes it possible to prevent collapse of the operation.

The average RGB values are used as the representative pixel values S in the digital camera 100. Alternatively, when the pixel values of the raw data D0 are YCC values, average YCC values Y0, Cb0, and Cr0 may be used as the representative pixel values S. In this case, the B-detection unit 134 may use Cb0 and Cr0 as the characteristic value to detect blocks in which both the Cb0 and Cr0 are equal to or smaller than the predetermined threshold, as the object blocks.

In the case of color coordinate systems (XYZ, La*b*, and the like) other than the RGB and YCC color coordinate systems, the representative pixel values and characteristic value may be determined depending on the color coordinate system so as to detect the object blocks.

The A-detection unit 132 may detect, as the object blocks, a block in which Y0 is equal to or greater than a predetermined threshold (blown-out highlight threshold) and a block in which Y0 is equal to or smaller than another predetermined threshold (blocked-up shadow threshold).

The digital camera 100 of this exemplary embodiment is configured such that the B-detection unit 134 detects blocks which are not detected as the object blocks in the second redetection processing performed by the A-detection unit 132. For example, the B-detection unit 134 may first perform the first detection processing and then the A-detection unit 132 may detect blocks which are not detected as the object blocks by the B-detection unit 134. In this case, in order to prevent collapse of the operation, a value other than |R0/G0-1| and |B0/G0-1| may be used as the characteristic value.

The B-detection unit 134 and the A-detection unit 132 may perform detection simultaneously and may output their own detection results to their own correction units 140. In this case, the correction unit 140 may calculate correction values for blocks excluding the blocks detected as the object blocks by both the B-detection unit 134 and the A-detection unit 132 and the blocks detected as the object blocks by either one of the B-detection unit 134 and the A-detection unit 132.

In the digital camera 100 of this exemplary embodiment, the B-detection unit 134 uses |R0/G0-1| and |B0/G0-1| as the characteristic value that represents the difference between the color represented by the representative pixel values S and gray. Alternatively, a difference between a maximum value and a minimum value among the average RGB values R0, G0, and B0, for example, may be used as the characteristic value.

Further, the digital camera 100 of this exemplary embodiment detects the object blocks through the second detection processing performed by the A-detection unit 132 and the first detection processing performed by the B-detection unit 134. Alternatively, the detection of the object blocks may be achieved by using any characteristic value which causes no problem of collapsing the operation during the first detection processing, such as the difference between the maximum value and the minimum value among the average RGB values R0, G0, and B0, and by carrying out only the first detection processing.

The technique according to the present invention is not limited to image pickup apparatuses such as digital cameras, and is also applicable to any image processing apparatus for processing raw data obtained by a digital image pickup apparatus such as an image reproducing apparatus including a printer and an image display device.

Moreover, in this exemplary embodiment, a blown-out highlight portion and a blocked-up shadow portion of an image are detected so as to remove the blown-out highlight portion or the blocked-up shadow portion in the case of obtaining correction values for the white balance correction and the like. More alternatively, in digital image pickup apparatuses, for example, the technique according to the present invention can be applied to detection of blown-out highlights and blocked-up shadows in carrying out exposure control or the like. The detection is carried out while checking the amount of blown-out highlights and blocked-up shadows (areas in which the grayscale is not expressed) which exceeds the dynamic range, so as to prevent blown-out highlights and blocked-up shadows from occurring.

While the invention has been described in above exemplary embodiment, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An image processing apparatus comprising:
a representative pixel value calculation unit that divides an image into a plurality of blocks and calculates representative pixel values for each of the plurality of blocks; and
a detection unit that detects an object block from among the plurality of blocks, the object block being a block which includes one of a blown-out highlight and a blocked-up shadow,
wherein the detection unit performs a first detection processing for obtaining one of a difference between a color represented by the representative pixel values and gray, and a value that can approximately represent the difference, as a characteristic value, and for detecting a block having the characteristic value equal to or smaller than a first threshold, as the object block,
wherein the detection unit performs a second detection processing for detecting, as the object block, a block in which a brightness represented by the representative pixel values is equal to or greater than a second threshold and a block in which the brightness is equal to or smaller than a third threshold, the third threshold being smaller than the second threshold, wherein the detection unit first performs the second detection processing on the plurality of blocks and then performs the first detection processing on blocks other than the object block detected by the second detection processing.

2. The image processing apparatus according to claim 1, wherein the representative pixel values are average values of pixel values of pixels in the block.

3. The image processing apparatus according to claim 1, wherein
the representative pixel values are RGB values R0, G0, and B0,
and the detection unit calculates, in the first detection processing, IR0/G0-11 and IB0/G0-11 as the characteristic value, and detects, as the object block, a block in which IR0/G0-11 is equal to or smaller than a value corresponding to the first threshold and in which IB0/G0-11 is equal to or smaller than a value corresponding to the first threshold.

4. The image processing apparatus according to claim 1, wherein
the representative pixel values are RGB values R0, G0, and B0, and
the detection unit calculates, in the first detection processing, a difference between a maximum value and a minimum value among the RGB values as the characteristic value, and detects, as the object block, a block in which the difference is equal to or smaller than the first threshold.

5. The image processing apparatus according to claim 1, wherein
the representative pixel values are YCC values Y0, Cb0, and Cr0, and
the detection unit obtains, in the first detection processing, the Cb0 and Cr0 as the characteristic value, and detects, as the object block, a block in which the Cb0 is equal to or smaller than a value corresponding to the first threshold and in which the Cr0 is equal to or smaller than a value corresponding to the first threshold.

6. The image processing apparatus according to claim 1, wherein
in the case that the representative pixel values are RGB values R0, G0, and B0, the detection unit detects, in the second detection processing, a block in which all the values R0, G0, and B0 are equal to or greater than a threshold corresponding to the second threshold and a block in which all the values R0, G0, and B0 are equal to or smaller than a threshold corresponding to the third threshold, as the object block, and
in the case that the representative pixel values are YCC values Y0, Cb0, and Cr0, the detection unit detects, in the second detection processing, a block in which the Y0 is equal to or greater than the second threshold and a block in which the Y0 is equal to or smaller than the third threshold, as the object block.

7. The image processing apparatus according to claim 1, further comprising a correction unit that performs at least one of white balance correction and exposure correction on the image,
wherein the correction unit obtains a correction value for blocks other than the object block detected by the detection unit.

8. The image processing apparatus according to claim 1, being a digital image pickup apparatus.

9. The image processing apparatus according to claim 1, being an image reproducing apparatus.

10. An image processing method comprising:
dividing an image into a plurality of blocks;
calculating representative pixel values for each of the plurality of blocks; and
performing a first detection processing, in a case of detecting an object block including one of a blown-out highlight and a blocked-up shadow from among the plurality of blocks, for obtaining one of a difference between a color represented by the representative pixel values and gray, and a value that can approximately represent the difference, as a characteristic value, and for detecting a block in which the characteristic value is equal to or smaller than a first threshold, as the object block;
performing a second detection processing for detecting, as the object block, a block in which a brightness represented by the representative pixel values is equal to or greater than a second threshold and a block in which the brightness is equal to or smaller than a third threshold, the third threshold being smaller than the second threshold,
wherein:
the second detection processing is first performed on the plurality of blocks, and
the first detection processing is performed on blocks other than the object block detected by the second detection processing.

11. The image processing method according to claim 10, wherein the representative pixel values are average values of pixel values of pixels in the block.

12. The image processing method according to claim 10, wherein
the representative pixel values are RGB values R0, G0, and B0, and
the first detection processing includes calculating IR0/G0-11 and IB0/G0-11 as the characteristic value and detecting, as the object block, a block in which IR0/G0-11 is equal to or smaller than a value corresponding to the first threshold and in which IB0/G0-11 is equal to or smaller than a value corresponding to the first threshold.

13. The image processing method according to claim 10, wherein
the representative pixel values are RGB values R0, G0, and B0, and
the first detection processing includes calculating a difference between a maximum value and a minimum value among the RGB values as the characteristic value, and detecting, as the object block, a block in which the difference is equal to or smaller than the first threshold.

14. The image processing method according to claim 10, wherein
the representative pixel values are YCC values Y0, Cb0, and Cr0, and the first detection processing includes obtaining the Cb0 and Cr0 as the characteristic value, and detecting, as the object block, a block in which the Cb0 is equal to or smaller than a value corresponding to the first threshold and in which the Cr0 is equal to or smaller than a value corresponding to the first threshold.

15. The image processing method according to claim 10, wherein
in the case that the representative pixel values are RGB values R0, G0, and B0, the second detection processing includes detecting, as the object block, a block in which all the values R0, G0, and B0 are equal to or greater than a threshold corresponding to the second threshold and a block in which all the values R0, G0, and B0 are equal to or smaller than a threshold corresponding to the third threshold, and in the case that the representative pixel values are YCC values Y0, Cb0, and Cr0, the second detection processing includes detecting, as the object block, a block in which the Y0 is equal to or greater than the second threshold and a block in which the Y0 is equal to or smaller than the third threshold.

* * * * *